(12) United States Patent
Liu

(10) Patent No.: US 9,414,708 B2
(45) Date of Patent: Aug. 16, 2016

(54) BREWING CONTAINER WITH DOUBLE-LAYER FILTERING STRUCTURE

(71) Applicant: Ming-Tung Liu, Taipei (TW)

(72) Inventor: Ming-Tung Liu, Taipei (TW)

( * ) Notice: Subject to any disclaimer, the term of this patent is extended or adjusted under 35 U.S.C. 154(b) by 361 days.

(21) Appl. No.: 14/212,396

(22) Filed: Mar. 14, 2014

(65) Prior Publication Data

US 2015/0257577 A1    Sep. 17, 2015

(51) Int. Cl.
*A47J 31/06*    (2006.01)
*A47J 31/18*    (2006.01)

(52) U.S. Cl.
CPC ............ *A47J 31/0605* (2013.01); *A47J 31/061* (2013.01); *A47J 31/0615* (2013.01); *A47J 31/0626* (2013.01); *A47J 31/0636* (2013.01); *A47J 31/18* (2013.01)

(58) Field of Classification Search
CPC . A47J 31/0636; A47J 31/061; A47J 31/0615; A47J 31/06; A47J 31/18
USPC .................................... 99/299, 323, 317, 306
See application file for complete search history.

(56) References Cited

U.S. PATENT DOCUMENTS

| | | | | |
|---|---|---|---|---|
| 1,188,249 | A * | 6/1916 | Cook ..................... | A47J 31/02 99/299 |
| 2,047,134 | A * | 7/1936 | Coleman ............. | A47J 31/0631 99/298 |
| 2,951,431 | A * | 9/1960 | Hugentobler ....... | A47J 31/0605 99/285 |
| 6,164,190 | A * | 12/2000 | Tien Lin ................. | A47J 31/18 99/299 |
| 9,055,836 | B2 * | 6/2015 | Liu ........................ | A47J 31/061 |
| 2012/0160107 | A1 * | 6/2012 | Tien ...................... | A47J 31/061 99/298 |

* cited by examiner

*Primary Examiner* — Reginald L Alexander
(74) *Attorney, Agent, or Firm* — Bacon & Thomas, PLLC

(57) ABSTRACT

The present invention is to provide a brewing container, which includes a base formed with a through groove; a water-stopping member; a cup having a bottom end formed with a lower opening, wherein the bottom of the cup is engageable with the through groove so as to joint the cup, the water-stopping member and the base together to form a single unit; and a filtering device including an upper filtering element and a lower filtering element, wherein the lower filtering element has a larger number of openings than the upper filtering element, the bottom of the lower filtering element can be mounted inside the cup to cover the lower opening and form a first filtering space between the lower filtering element and the lower opening, and the bottom of the upper filtering element is engageable with the top of the lower filtering element to form a second filtering space therebetween.

12 Claims, 6 Drawing Sheets

BREWING CONTAINER WITH DOUBLE-LAYER FILTERING STRUCTURE

FIELD OF THE INVENTION

The present invention relates to a brewing container, more particularly to a brewing container having a double-layer filtering structure, which includes an upper filtering element and a lower filtering element mounted inside a cup to cover a lower opening of the cup and form a first filtering space between the lower filtering element and the lower opening, wherein the bottom of the upper filtering element is engageable with the top of the lower filtering element to form a second filtering space therebetween, and the lower filtering element has a larger number of openings than the upper filtering element. Thus, the double-layer filtering structure is able to effectively prevent the brewing material from accumulating on the filtering elements and thereby solve the problem of the brewed liquid being unable to flow into a beverage container.

BACKGROUND OF THE INVENTION

Recently, with the improvement of craftsmanship and people's living standards, one who wishes to buy a new product pays attention not only to the product's performance and price, but also to its convenience and safety of use. Such a change in market trends has driven manufacturers to innovate on a regular basis in order to meet most consumers' needs. Take the commonplace beverage containers for example. A cup of freshly brewed coffee or tea is typically made with a filter or tea bag so that coffee powder or tea leaves are filtered out and separated from the coffee liquid or tea infusion. The aforesaid brewing process, however, requires the filter or tea bag to be removed to another container, if not directly discarded, after the coffee or tea is made, lest the water remaining in the filter or tea bag wet the table, causing inconvenience to the one who has just made the coffee or tea.

In view of this, the inventor of the present invention developed a brewing container which can be conveniently carried around and make coffee or tea rapidly. Referring to FIG. 1 and FIG. 2, the brewing container 1 has a top side concavely provided with a receiving space 10 and a bottom side formed with a through hole 13 and a plurality of assembly holes 18. A water-stopping plate 2 is connected to the bottom side of the brewing container 1 and is peripherally provided with a plurality of pegs 21, wherein each peg 21 is configured to extend into, and move reciprocally up and down in, one of the assembly holes 18. The water-stopping plate 2 is centrally provided with a post 23. The post 23 is configured to extend into the through hole 13 and has a top end mounted with a water-stopping block 25. When the brewing container 1 is placed on a tabletop, with the water-stopping plate 2 fallen down naturally, each peg 21 abuts against the lower edge of the corresponding assembly hole 18. Meanwhile, the water-stopping block 25 blocks the through hole 13 completely (see FIG. 1). As a result, the liquid in the receiving space 10 cannot flow out through the through hole 13. When the brewing container 1 is placed on a cup, which pushes the water-stopping plate 2 upward, each peg 21 abuts against the upper edge of the corresponding assembly hole 18, and the water-stopping block 25 leaves the position where it blocks the through hole 13, allowing the liquid in the receiving space 10 to flow out through the through hole 13. Thus, the brewing container 1 can be used to make coffee or tea and serve as a convenient temporary container for the used ground coffee or tea bag, without the user having to worry about the remaining liquid in the brewing container 1 flowing out.

Nevertheless, the inventor has found during continual research and development of brewing containers that the brewing container 1 still has certain drawbacks in use, as detailed below:

(1) Difficulty in disassembly and cleaning: Referring back to FIG. 1 and FIG. 2, the pegs 21 are integrally formed with the water-stopping plate 2 and are not elastically compressible. Therefore, in order to connect the water-stopping plate 2 to the bottom side of the brewing container 1, the pegs 21 must be deformed, or they cannot extend into the respective assembly holes 18. By the same token, when it is desired to remove the water-stopping plate 2 for cleaning, the pegs 21 must also be deformed to be released from the respective assembly holes 18. Whether it is to mount or dismount the water-stopping plate 2, the user must exert a considerable force to deform the pegs 21, and the connections between the pegs 21 and the water-stopping plate 2 may break due to improper force application, thus impairing the durability of the brewing container 1. Also, the difficulty in disassembly makes it inconvenient to clean the water-stopping plate 2.

(2) Low flowing speed of beverages: The brewing container 1 is mounted therein with a filtering element 26 which prevents the brewing material (i.e., ground coffee or tea leaves) in the receiving space 10 from flowing with the coffee or tea into a cup. However, taking tea leaves for example, most of the openings of the filtering element 26 tend to be blocked by the tea leaves such that the liquid in the receiving space 10 cannot flow into the cup placed below. In use, therefore, the user has to stir the tea leaves in the receiving space 10 with a spoon in order for the liquid (i.e., tea) to be rapidly filtered into the cup.

In light of the above, the inventor contemplated designing a novel brewing container structure which not only can be easily assembled/disassembled and cleaned, but also can keep its filtering element from being blocked by the brewing material. The inventor began by analyzing the structures of various brewing containers, hoping to overcome the foregoing drawbacks by developing a brewing container that caters for both manufacture considerations and user needs.

BRIEF SUMMARY OF THE INVENTION

In view of the fact that the existing brewing containers are generally "difficult to clean" and have "a low flow speed due to the accumulation of brewing material", the inventor of the present invention incorporated years of practical experience into extensive research and testing and finally succeeded in developing a brewing container with a double-layer filtering structure which effectively increases the convenience of beverage making.

It is an objective of the present invention to provide a brewing container having a double-layer filtering structure. The brewing container includes a base, a water-stopping member, a cup, and a filtering device. The base is formed with a through groove. The through groove is provided with a plurality of first blocks which extend in the radial direction of the through groove. The bottom of the water-stopping member is concavely provided with a plurality of inclined guiding surfaces. Each of the inclined guiding surfaces has one end located at the bottom end of the water-stopping member and an opposite end (hereinafter referred to as the second end) spaced from the bottom end of the water-stopping member by a predetermined depth. The predetermined depth matches the configuration of each first block such that, when each first block abuts against the second end of a corresponding one of the inclined guiding surfaces, the water-stopping member is positioned in the through groove. The water-stopping member is vertically penetrated by a plurality of flow channels, and the top of the water-stopping member is provided with an upwardly extending water-stopping rod and is laterally provided with at least one second block. The top end of the cup is formed with an upper opening, and the bottom end of the cup is formed with a lower opening. The upper opening is in communication with the lower opening such that a receiving space is formed in the cup. The bottom of the cup is provided with a downwardly extending engaging wall, and the engaging wall is provided with at least one engaging groove. When the engaging wall abuts against the base, the second block is engageable in the engaging groove such that the base, the water-stopping member, and the cup jointly form a single unit. When each first block of the base abuts against the second end of the corresponding inclined guiding surface, the top end of the water-stopping rod seals the lower opening, but the second block does not abut against the top edge of the engaging groove. The filtering device includes an upper filtering element and a lower filtering element. The lower filtering element has a larger number of openings than the upper filtering element. The bottom of the lower filtering element can be mounted at the bottom of the receiving space to cover the lower opening, forming a first filtering space between the lower filtering element and the lower opening. The bottom of the upper filtering element is engageable with the top of the lower filtering element to form a second filtering space between the upper filtering element and the lower filtering element. When the cup is rotated, the water-stopping member is driven to rotate by the cup. Meanwhile, with each inclined guiding surface abutting against the corresponding first block, the water-stopping member is pushed by the first blocks and moved upward during relative rotation of the water-stopping member and the base. As a result, the top of the water-stopping rod separates from the lower opening, and the lower opening is in communication with the flow channels. In the present invention, the filtering elements, which have different numbers of openings, effectively prevent the brewing material from accumulating on the filtering device and thereby solve the problem of the brewed liquid being unable to flow into a beverage container. Moreover, as the water-stopping member can be conveniently removed for cleaning, the cleaning of the entire brewing container is made easy.

BRIEF DESCRIPTION OF THE SEVERAL VIEWS OF THE DRAWINGS

The technical means, structural features, and objectives of the present invention will be best understood by referring to the following detailed description of some illustrative embodiments in conjunction with the accompanying drawings, in which.

DETAILED DESCRIPTION OF THE INVENTION

Figure 1:
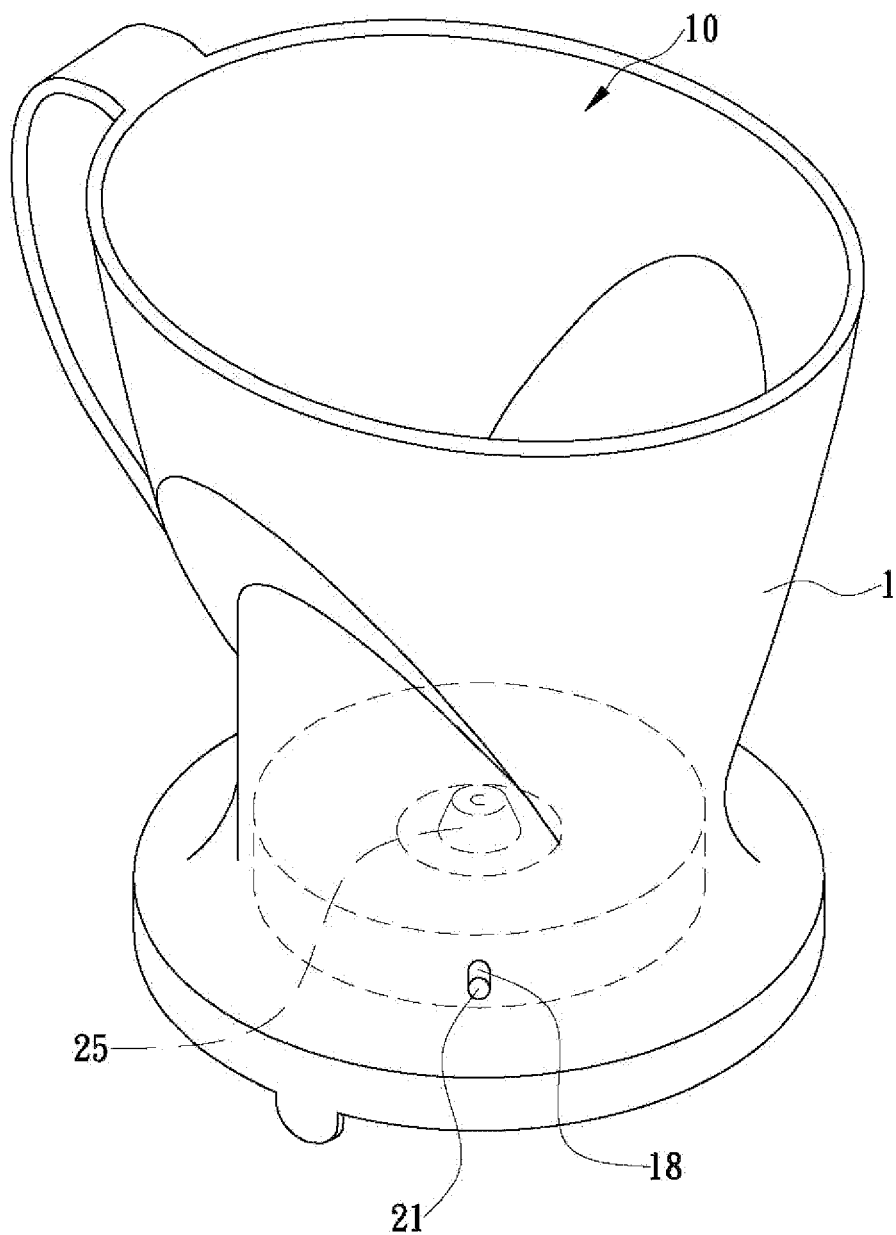
FIG. 1 is a perspective view of a conventional brewing container.
Figure 2:
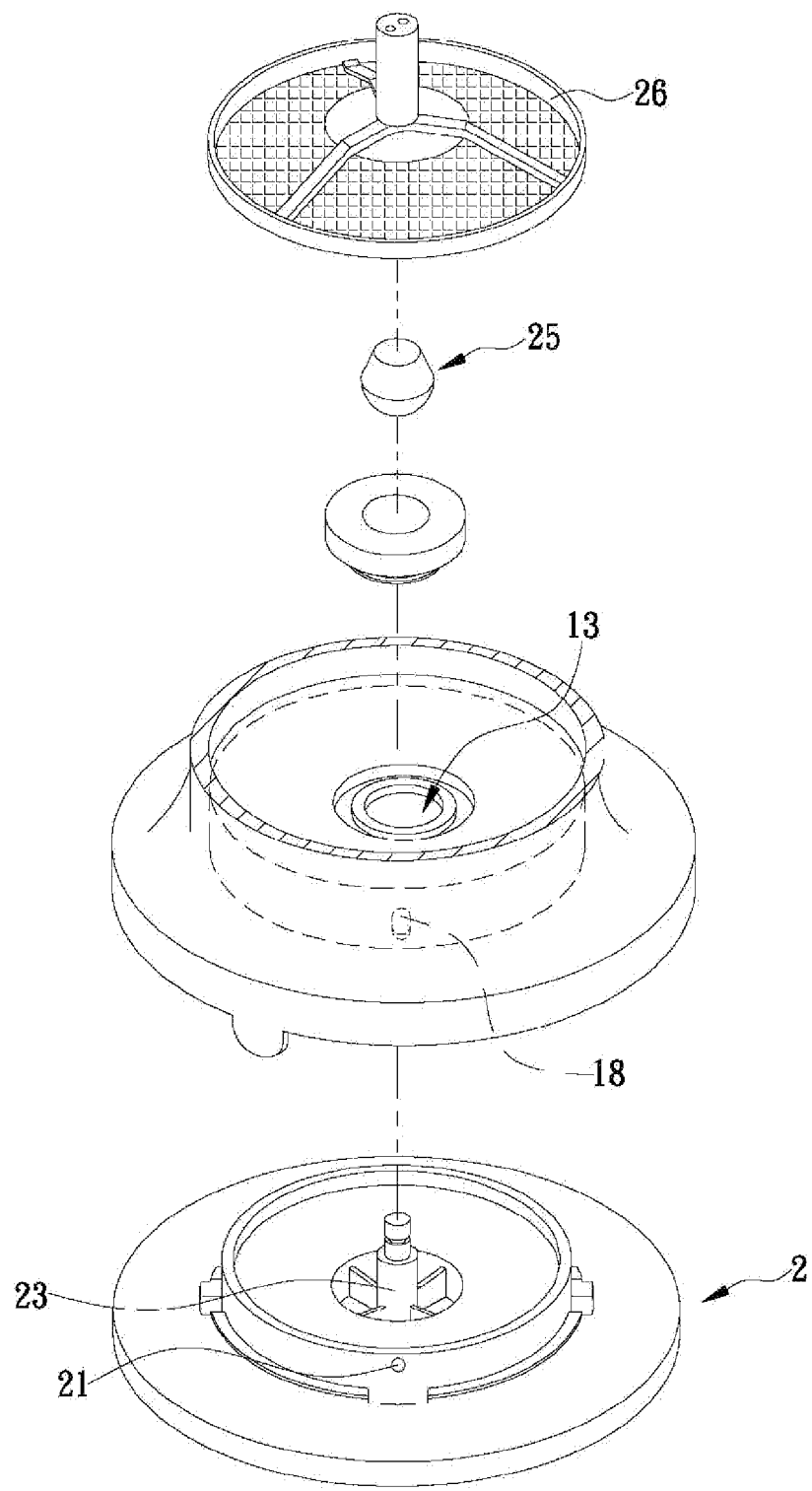
FIG. 2 is an exploded perspective view of the conventional brewing container shown in FIG. 1.
Figure 3:
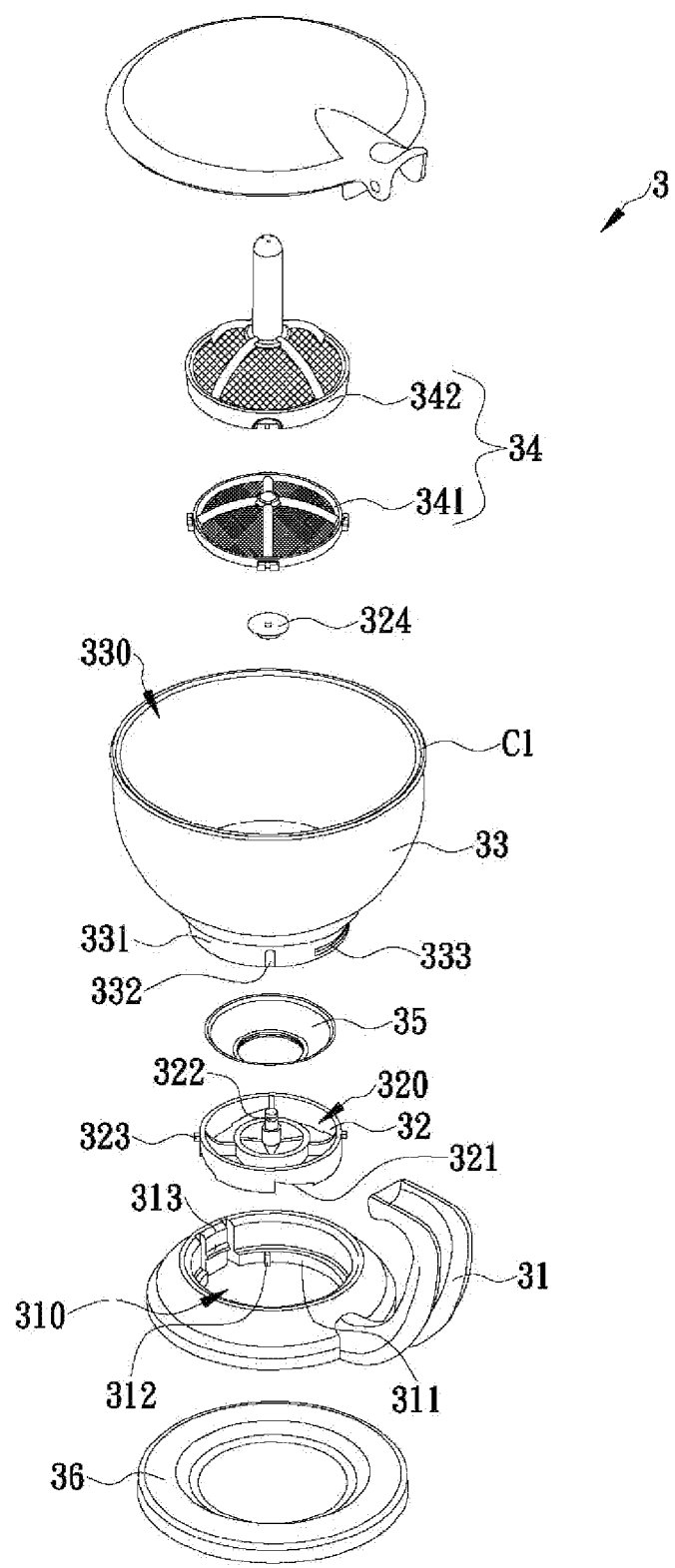
FIG. 3 is an exploded perspective view of the brewing container of the present invention.

The present invention provides a brewing container having a double-layer filtering structure. Referring to FIG. 3 for the first preferred embodiment of the present invention, the brewing container 3 includes a base 31, a water-stopping member 32, a cup 33, and a filtering device 34. The base 31 is centrally formed with a through groove 310. The lower half of the base 31 has an inner wall surface which corresponds in position to the through groove 310 and which is circumferentially provided with a rib 311. A plurality of first blocks 312 protrude from the rib 311 in the radial direction of the through groove 310. The water-stopping member 32 matches the through groove 310 in configuration and is movably positioned in the through groove 310. The bottom of the water-stopping member 32 is concavely provided with a plurality of inclined guiding surfaces 321. Each inclined guiding surface 321 has one end located at the bottom end of the water-stopping member 32 and an opposite end (hereinafter referred to as the second end) spaced apart from the bottom end of the water-stopping member 32 by a predetermined depth.

Figure 6:
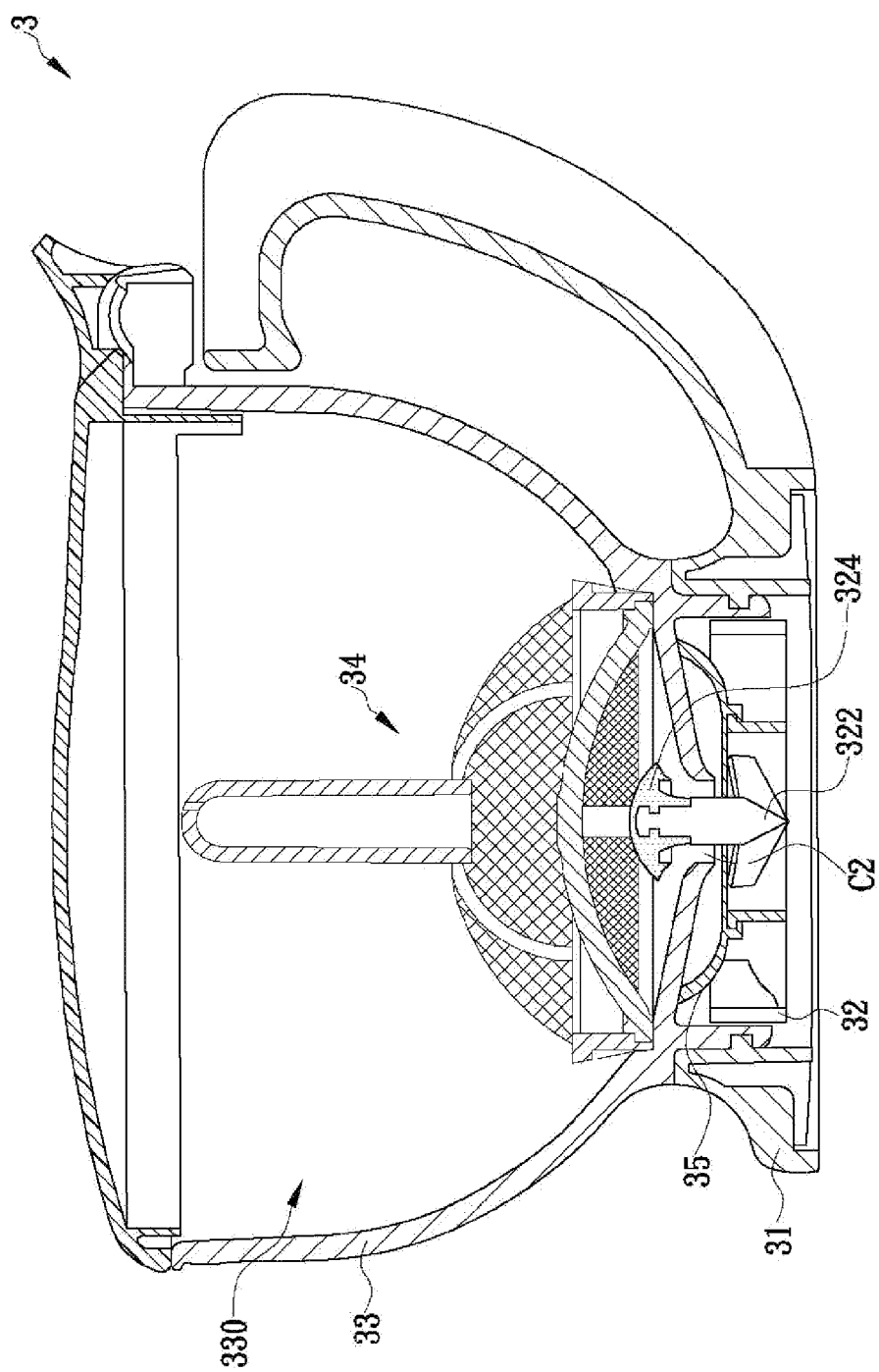
FIG. 6 is another sectional view showing the brewing container of the present invention in use.

In this embodiment, referring to FIG. 3 and FIG. 6, the predetermined depth corresponds to the vertical length of each first block 312. Therefore, when the water-stopping member 32 is positioned in the through groove 310, each first block 312 abuts precisely against the second end of a corresponding one of the inclined guiding surfaces 321. The water-stopping member 32 is vertically penetrated by a plurality of flow channels 320. The top of the water-stopping member 32 is provided with an upwardly extending water-stopping rod 322. The top of the water-stopping member 32 further has a lateral side protrudingly provided with at least one second block 323. The top end of the cup 33 is formed with an upper opening C1, and the bottom end of the cup 33 is formed with a lower opening C2. The upper opening C1 is in communication with the lower opening C2 such that a receiving space 330 is formed in the cup 33. The bottom of the cup 33 is provided with a downwardly extending engaging wall 331. The engaging wall 331 is provided with at least one engaging groove 332. When the engaging wall 331 abuts against the rib 311 of the base 31, the second block 323 is positioned above the rib 311 and can be engaged in the engaging groove 332 such that the base 31, the water-stopping member 32, and the cup 33 jointly form a single unit.

Figure 4:
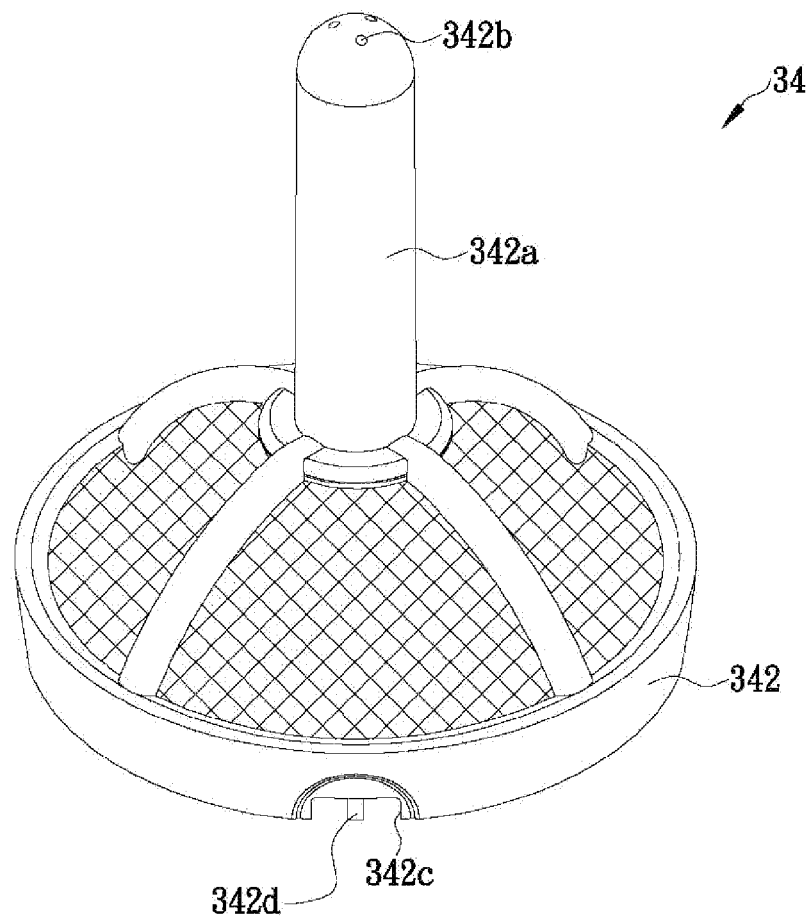
FIG. 4 is an exploded perspective view of the filtering device of the brewing container of the present invention.
Figure 4:
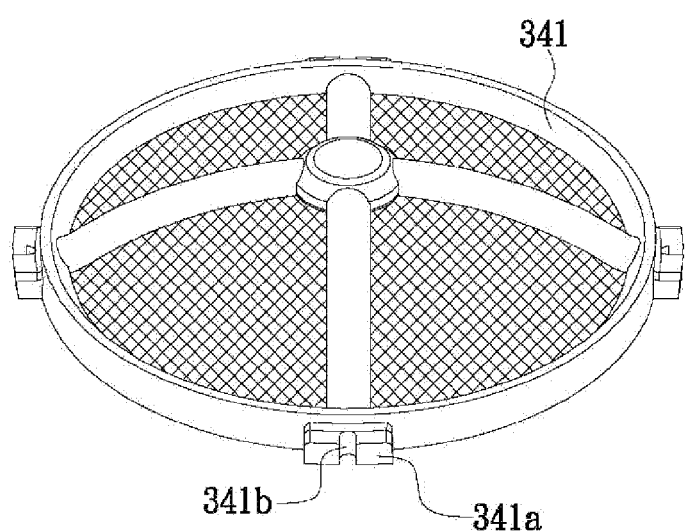
Figure 5:
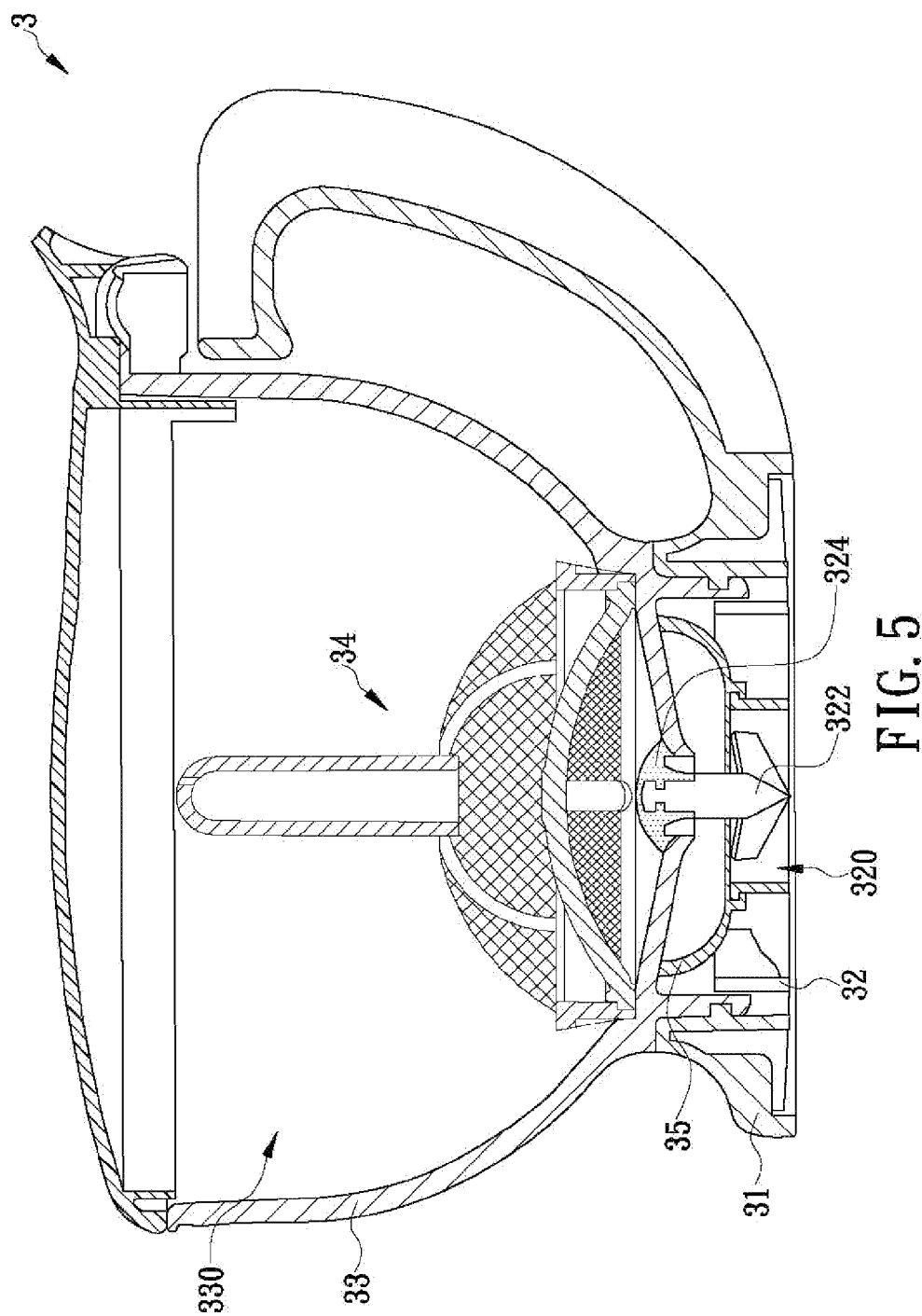
FIG. 5 is a sectional view showing the brewing container of the present invention in use.

Referring to FIG. 3~FIG. 6, when each first block 312 of the base 31 abuts against the second end of the corresponding inclined guiding surface 321, the top end of the water-stopping rod 桿 322 seals the lower opening C2 (see FIG. 5, which shows that the top end of the water-stopping rod 322 in this embodiment is mounted with a water-stopping block 324 made of an elastic material, and that the water-stopping block 324 matches the lower opening C2 in configuration in order to seal the lower opening C2 in a watertight manner). At this moment, however, the second block 323 does not abut against but is spaced from the top edge of the engaging groove 332. The filtering device 34 includes a lower filtering element 341 and an upper filtering element 342. The lower filtering element 341 has a larger number of openings than the upper filtering element 342. (In this embodiment, the upper filtering element 342 has about 60~100 openings, and the lower filtering element 341 has about 110~250 openings.) The bottom of the lower filtering element 341 can be mounted at the bottom of the receiving space 330 to cover the lower opening C2, thus forming a first filtering space between the lower filtering element 341 and the lower opening C2. The bottom of the upper filtering element 342 is engageable with the top of the lower filtering element 341 to form a second filtering space between the upper filtering element 342 and the lower filtering element 341.

To use the brewing container 3, a brewing material such as ground coffee or tea leaves is put into the receiving space 330, which is subsequently filled with hot water, allowing the brewing material to mix sufficiently with the hot water to make coffee or tea. Then, the brewing container 3 is placed on a beverage container, and the cup 33 is rotated such that the engaging wall 331 of the cup 33 drives the water-stopping member 32 to rotate. As the inclined guiding surfaces 321 respectively abut against the first blocks 312, the water-stopping member 32, which is rotated relative to the base 31, is pushed by the first blocks 312 and moved upward. Consequently, the top of the water-stopping rod 322 separates from the lower opening C2, and the lower opening C2 is in communication with the flow channels 320 (see FIG. 6).

Once the lower opening C2 is opened, the brewed beverage is filtered sequentially through the upper filtering element 342 and the lower filtering element 341. Meanwhile, those relatively large pieces of the brewing material (e.g., whole tea leaves) are retained on the top surface of the upper filtering element 342. Since gaps are formed between the relatively large pieces of the brewing material, the relatively small pieces of the brewing material (e.g., broken tea leaves or coffee powder) are allowed to pass through the lower filtering element 341 and enter the first filtering space. Thus, fluidity of liquid and air between the receiving space 330, the first filtering space, and the second filtering space is maintained, and the brewed beverage can flow rapidly into the beverage container below the brewing container 3.

Thanks to the filtering elements 341 and 342, which have different numbers of openings, the brewing container 3 of the present invention prevents the brewed beverage from being hindered or blocked by the brewing material which may otherwise accumulate uniformly on the filtering device 34. In addition, as the base 31, the water-stopping member 32, and the cup 33 can be readily detached from one another and then put together without having to deform any part of them or connect them via mutual engagement, the user can conveniently and intuitively separate the water-stopping member 32 from the other two for cleaning.

In this embodiment, with continued reference to FIG. 3, the filtering elements 341 and 342 are formed by a plurality of ribs and filter screens, and the top end of the upper filtering element 342 is extended with a post 342a. The post 342a is hollow and has a plurality of through holes 342b at the top end, thus allowing the air or liquid in the second filtering space to flow sequentially through the bottom end and a hollow passage of the post 342a to the top end of the post 342a and discharge into the receiving space 330 via the through holes 342b to provide good circulation. With a length ranging from 2 to 10 cm, the post 342a can be gripped by the user to facilitate removal of the filtering device 34 for cleaning.

The assembly method of the filtering device 34 is briefly stated as follows. In the present embodiment, the periphery of the bottom of the upper filtering element 342 is concavely provided with a plurality of recesses 342c, and the bottom surface of each recess 342c is protrudingly provided with an insertion post 342d. The periphery of the lower filtering element 341, on the other hand, is protrudingly provided with a plurality of projections 341a, and each projection 341a is penetrated by an insertion hole 341b. The insertion holes 341b correspond respectively in position to the recesses 342c such that the projections 341a are respectively engageable in the recesses 342c and the insertion posts 342d are respectively engageable in the insertion holes 341b to connect the upper filtering element 342 and the lower filtering element 341 tightly together. It should be pointed out, however, that the filtering device 34 depicted in FIG. 4 is but one embodiment of the present invention; in other embodiments, the filtering device 34 may be assembled by other means (e.g., by fasteners, by bayonet connectors).

To enhance its stability in the assembled state, the brewing container 3 is additionally provided with several positioning mechanisms. As shown in FIG. 3, the brewing container further includes an elastic element 35 configured as a hollow cone and made of an elastic material such as silicone. The elastic element 35 has one end to be fitted around the bottom of the cup 33 and the opposite end to be fitted around the top of the water-stopping member 32 in order to connect the cup 33 firmly to the water-stopping member 32. When the cup 33 is rotated in such a way that the water-stopping member 32 is moved upward and the water-stopping rod 322 no longer seals the lower opening C2, the elastic element 35 is compressed by the water-stopping member 32. Once the user releases the cup 33, the elastic restoring force of the elastic element 35 will move the water-stopping member 32 toward the base 31 to keep the first blocks 312 at the second ends of the inclined guiding surfaces 321 respectively.

In addition, the inner wall surface of the through groove 310 has two corresponding portions each provided with a positioning block 313 (FIG. 3 showing only one of the positioning blocks 313). Each positioning block 313 has one end fixedly provided at the inner wall surface of the through groove 310 and the opposite end (hereinafter referred to as the second end) movably extending toward the center of the through groove 310. The cup 33, on the other hand, is provided with a positioning groove 333 corresponding in position to each positioning block 313, wherein the positioning grooves 333 penetrate the engaging wall 331. Installation of the cup 33 begins by the bottom edge of the engaging wall 331 pushing the second ends of the positioning blocks 313 toward the inner wall surface of the through groove 310. Once the positioning grooves 333 are moved to positions corresponding respectively to the positioning blocks 313, the positioning blocks 313 are respectively engaged in the positioning grooves 333 due to the elastic restoring forces of the positioning blocks 313. In consequence, the cup 33 is connected to the base 31.

The bottom of the base 31 may be further provided with a pad 36 to ensure stability of the base 31 and prevent the brewing container 3 from toppling when the brewing container 3 is placed on a tabletop.

While the invention herein disclosed has been described by means of specific embodiments, numerous modifications and variations could be made thereto by those skilled in the art without departing from the scope of the invention set forth in the claims.

What is claimed is:

1. A brewing container with a double-layer filtering structure, comprising:
a base centrally formed with a through groove, the through groove being provided therein with a plurality of first blocks extending in a radial direction of the through groove;
a water-stopping member matching the through groove in configuration, the water-stopping member having a bottom concavely provided with a plurality of inclined guiding surfaces, each said inclined guiding surface having an end located at a bottom end of the water-stopping member and an opposite second end spaced from the bottom end of the water-stopping member by a predetermined depth, the predetermined depth matching a configuration of each said first block such that, when the water-stopping member is positioned in the through groove, each said first block abuts against the second end of a corresponding one of the inclined guiding surfaces, the water-stopping member further having a top provided with a water-stopping rod and with at least one second block, the water-stopping member being vertically penetrated by a plurality of flow channels;

a cup having a top formed with an upper opening and a bottom formed with a lower opening, the upper opening being in communication with the lower opening such that a receiving space is formed in the cup, the bottom of the cup being provided with a downwardly extending engaging wall, the engaging wall being provided with at least one engaging groove, wherein when the engaging wall abuts against the base, the engaging groove is engageable with the second block such that the base, the water-stopping member, and the cup jointly form a single unit, and when the first blocks of the base respectively abut against the second ends of the inclined guiding surfaces, a top end of the water-stopping rod seals the lower opening, but the second block does not abut against a top edge of the engaging groove; and a filtering device including a lower filtering element and an upper filtering element, the lower filtering element having a bottom to be mounted at a bottom of the receiving space such that a first filtering space is formed between the lower filtering element and the lower opening, the upper filtering element having a bottom to be mounted at a top of the lower filtering element such that a second filtering space is formed between the upper filtering element and the lower filtering element, wherein when the cup is rotated, the cup drives the water-stopping member to rotate, and with the inclined guiding surfaces respectively abutting against the first blocks, the water-stopping member is pushed by the first blocks and moved upward such that the top end of the water-stopping rod separates from the lower opening, allowing the lower opening to communicate with the flow channels.

2. The brewing container of claim 1, wherein the lower filtering element has a larger number of openings than the upper filtering element.

3. The brewing container of claim 2, wherein the upper filtering element has a top end provided with a post, and the post is hollow and has a top end formed with a plurality of through holes in order for bubbles or a liquid in the second filtering space to be circulated through the through holes of the post into the receiving space.

4. The brewing container of claim 3, wherein the post has a length ranging from 2 to 10 cm.

5. The brewing container of claim 4, wherein the through groove has an inner wall surface circumferentially provided with a rib, the first blocks are protrudingly provided at the rib, and the second block is provided at a lateral edge of the top of the water-stopping member such that, when the water-stopping member is positioned in the through groove, the second block stays above the rib.

6. The brewing container of claim 5, further comprising an elastic element, the elastic element having an end mounted around the bottom of the cup and an opposite end mounted around the top of the water-stopping member, wherein the elastic element has an elastic restoring force capable of moving the water-stopping member toward the base to keep each said first block at the second end of the corresponding one of the inclined guiding surfaces.

7. The brewing container of claim 1, wherein the top end of the water-stopping rod is mounted with a water-stopping block, and the water-stopping block is made of an elastic material and matches the lower opening in configuration in order to seal the lower opening in a watertight manner.

8. The brewing container of claim 2, wherein the top end of the water-stopping rod is mounted with a water-stopping block, and the water-stopping block is made of an elastic material and matches the lower opening in configuration in order to seal the lower opening in a watertight manner.

9. The brewing container of claim 3, wherein the top end of the water-stopping rod is mounted with a water-stopping block, and the water-stopping block is made of an elastic material and matches the lower opening in configuration in order to seal the lower opening in a watertight manner.

10. The brewing container of claim 4, wherein the top end of the water-stopping rod is mounted with a water-stopping block, and the water-stopping block is made of an elastic material and matches the lower opening in configuration in order to seal the lower opening in a watertight manner.

11. The brewing container of claim 5, wherein the top end of the water-stopping rod is mounted with a water-stopping block, and the water-stopping block is made of an elastic material and matches the lower opening in configuration in order to seal the lower opening in a watertight manner.

12. The brewing container of claim 6, wherein the top end of the water-stopping rod is mounted with a water-stopping block, and the water-stopping block is made of an elastic material and matches the lower opening in configuration in order to seal the lower opening in a watertight manner.

* * * * *